United States Patent Office 3,492,267
Patented Jan. 27, 1970

3,492,267
STABILIZING POLY(VINYL CHLORIDE)
Louis Leonard Wood, Potomac, Md., assignor to W. R. Grace & Co., New York, N.Y., a corporation of Connecticut
No Drawing. Continuation-in-part of application Ser. No. 598,612, Dec. 2, 1966, which is a continuation-in-part of application Ser. No. 553,637, May 31, 1966. This application July 22, 1968, Ser. No. 746,303
Int. Cl. C08g 45/62
U.S. Cl. 260—45.75                               2 Claims

ABSTRACT OF THE DISCLOSURE

In abstract, this invention is directed to a process for stabilizing and inhibiting color formation in poly(vinyl chloride), comprising intimately mixing the poly(vinyl chloride) with a nontoxic or a toxic poly(vinyl chloride) stabilizer and a zinc complex of a β-dicarbonyl compound, the complex having the fomula

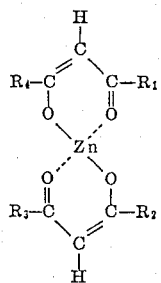

wherein any of $R_1$ through $R_4$ is separately a member of the group consisting of; (a) hydrogen; (b) an alkoxyl group having 1–20 carbons; (c) an alkyl group having 1–20 carbons; (d) a phenyl group; (e) a phenoxy group; (f) an aralkoxy group having 7–15 carbons; (g) an aralkyl group having 7–20 carbons; (h) a cycloalkyl group having 4–20 carbons; and (i) a cycloalkoxy group having a 4–20 carbons, all as recited hereinafter.

---

This application is a continuation-in-part of my copending application Ser. No. 598,612, filed Dec. 2, 1966 and now abandoned which is in turn a continuation-in-part of my application Ser. No. 553,637, filed May 31, 1966 and now abandoned which was copending with the aforesaid application Ser. No. 598,612.

This invention is in the field of stabilizing poly(vinyl chloride) to the effects of heat and to inhibiting color formation in poly(vinyl chloride).

Poly(vinyl chloride) stabilizers and stabilizing poly (vinyl chloride) to the effects of heat are well known in the art. An excellent review of the prior art is found in Chevassus and Broutelles, "The Stabilization of Polyvinyl Chloride," St. Martin's Press, New York, N.Y., 1963 which also reviews the use of zinc salts in poly (vinyl chloride) compositions to inhibit color formation in said compositions.

In summary this invention is directed to an improvement in a process for stabilizing poly(vinyl chloride) and inhibiting color formation in the poly(vinyl chloride) by intimately mixing the poly(vinyl chloride) with a stabilizer selected from the group consisting of nontoxic poly (vinyl chloride) stabilizers and toxic poly(vinyl chloride) stabilizers and a zinc compound, the stabilizer being present in a ratio of about 0.05–20 parts by weight of a stabilizer per 100 parts by weight of poly(vinyl chloride) and the zinc compound being present in an amount to supply 0.01–5 parts by weight per 100 parts by weight of poly (vinyl chloride), the improvement comprising using as the zinc compound a β-dicarbonyl having the formula

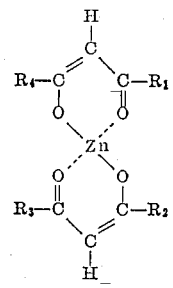

wherein any of $R_1$ through $R_4$ is separately a member of the group consisting of: (a) hydrogen; (b) an alkoxyl group having about 1–20 carbon atoms; (c) an alkyl group having about 1–20 carbon atoms; (d) a phenyl group; (e) a phenoxy group; (f) an aralkoxy group having about 7–20 carbon atoms; (g) an aralkyl group having about 7–20 carbon atoms; (h) a cycloalkyl group having about 4–20 carbon atoms; and (i) a cycloalkoxy group having about 4–20 carbon atoms.

In preferred embodiments of the process set forth in the above summary:
(1) $R_1$, $R_2$, $R_3$, and $R_4$ are methyl groups;
(2) $R_1$, $R_2$, $R_3$, and $R_4$ are ethyl groups;
(3) The stabilizer is present in a ratio of about 0.1–10 parts by weight per 100 parts of poly(vinyl chloride); and
(4) The zinc compound is present in a ratio of about 0.2–1 parts by weight per 100 parts by weight of poly (vinyl chloride).

In another preferred embodiment (Embodiment A), this invention is directed to a composition of matter adapted for stabilizing and inhibiting color formation in poly(vinyl chloride) constituting essentially 0.01–2000 parts by weight of a stabilizer selected from the group consisting of nontoxic poly(vinyl chloride) stabilizers and toxic poly(vinyl chloride) stabilizers and about 1 part by weight of a zinc compound of a β-dicarbonyl having the formula

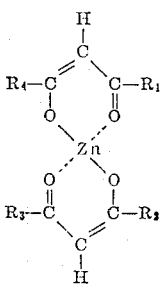

wherein any of $R_1$ through $R_4$ is separately a member of the group consisting of: (a) hydrogen; (b) an alkoxy group having about 1-20 carbon atoms; (c) an alkyl group having about 1-20 carbon atoms, (d) a phenyl group; (e) a phenoxy group; (f) an aralkoxy group having about 7-20 carbon atoms; (g) an aralkyl group having about 7-20 carbon atoms; (h) a cycloalkyl group having about 4-20 carbon atoms.

In specially preferred embodiments of Embodiment A, supra:

(1) $R_1$, $R_2$, $R_3$, and $R_4$ are methyl groups;
(2) $R_1$, $R_2$, $R_3$, and $R_4$ are ethyl groups; and
(3) The composition consists essentially of about 1-10 parts by weight of the stabilizer and about 1 part by weight of the zinc compound of the β-dicarbonyl.

In another preferred embodiment (Embodiment B) this invention is directed to a composition of matter consisting essentially of about 100 parts by weight of poly (vinyl chloride), about 0.05-20 parts by weight of a stabilizer selected from the group consisting of nontoxic poly(vinyl chloride) stabilizers and toxic poly(vinyl chloride) stabilizers, and about 0.01-5 parts by weight of a zinc compound of a β-dicarbonyl having the formula:

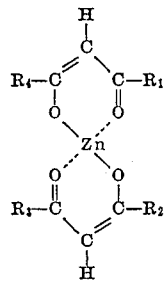

wherein any of $R_1$ through $R_4$ is separately a member of the group consisting of: (a) hydrogen; (b) an alkoxy group having about 1-20 carbon atoms; (c) an alkyl group having about 1-20 carbon atoms, (d) a phenyl group; (e) a phenoxy group; (f) an aralkoxy group having about 7-15 carbon atoms; (g) an aralkyl group having about 7-20 carbon atoms; (h) a cycloalkyl group having about 4-20 carbon atoms; and (i) a cycloalkoxy group having about 4-20 carbon atoms.

In specially preferred embodiments of Embodiment B, supra:

(1) $R_1$, $R_2$, $R_3$, and $R_4$ are methyl groups;
(2) $R_1$, $R_2$, $R_3$, and $R_4$ are ethyl groups; and
(3) The composition consists essentially of 100 parts by weight of poly(vinyl chloride), about 0.1-10 parts of the stabilizer and about 0.2-1 part of the zinc compound of the β-dicarbonyl.

Both the stabilization of poly(vinyl chloride) (and compositions containing poly(vinyl chloride)) to the effects of heat and the use of zinc salts to inhibit color formation in poly(vinyl chloride) and its compositions is, as stated supra, well known to those skilled in the art. However, the prior art taught the use of simple zinc salts such as zinc octoate, zinc stearate, zinc ricinoleate, and the like rather than zinc chelates of the type used in the instant invention, thereby to lead away from said invention and to make said invention unexpected, surprising, and unobvious to those skilled in the art.

It is an object of this invention to provide a method for stabilizing poly(vinyl chloride) the effects of heat and to inhibit color formation in the poly(vinyl chloride) and its compositions.

It is an object of this invention to provide an improved method for stabilizing poly(vinyl chloride) to the effects of heat and inhibit color formation in the poly(vinyl chloride) and its compositions.

It is an object of this invention to provide a composition of matter adapted for stabilizing poly(vinyl chloride) to the effects of heat and for inhibiting color formation in poly(vinyl chloride) and its compositions.

It is an object of this invention to provide an improved composition of matter adapted for stabilizing poly(vinyl chloride) to the effects of heat and to inhibit color formation in poly(vinyl chloride) and its compositions.

It is another object of this invention to provide a composition consisting essentially of poly(vinyl chloride) stabilized to the effects of heat and inhibited against color formation.

It is also an object of this invention to provide an improved composition of matter consisting essentially of poly(vinyl chloride) stabilized to the effects of heat and inhibited against color formation.

It is an object of the present invention to provide a novel and superior metal containing stabilizing additive for chlorine containing polymers including poly(vinyl chloride) and copolymers of vinyl chloride.

It is a further object to provide a metal containing additive for chlorine containing polymers which is compatible with said polymers and other stabilizers, plasticizers, and impact improvers normally added thereto.

It is a further object to provide metal containing stabilizing additives for chlorine containing polymers which are nontoxic and which do not decrease the long term stability of the polymer formulations.

These and still further objects of the present invention will become readily apparent to one skilled in the art from the following detailed description and specific examples.

Poly(vinyl chloride) stabilizers which stabilize poly (vinyl chloride)—including poly(vinyl chloride)-containing compositions—are well known in the art. Said stabilizers, as is well known to those skilled in art, are of two types. These are: (a) nontoxic poly(vinyl chloride) stabilizers; and (b) toxic poly(vinyl chloride) stabilizers.

Typical examples of nontoxic poly(vinyl chloride) stabilizers include:

(1) Calcium salts such as calcium stearate, calcium oleate, calcium salts of mixed fatty acids, and the like;

(2) Magnesium salts such as magnesium stearate, magnesium oleate, magnesium salts of mixed fatty acids, and the like;

(3) Polyols such as glycerol monostearate, glycerol monooleate glycerol monolaurate, glycerol, and the like;

(4 Epoxides such as epoxidized soybean oil; epoxidized, corn oil; epoxidized safflower oil, and the like;

(5) Orthoesters such as those taught by my British Patent No. 1,110,958 and the like;

(6) Nontoxic resins such as melamine formaldehyde resin and the like; and (7) Nontoxic poly(vinyl chloride) stabilizers listed in the above-mentioned "The Stabilization of Polyvinyl Chloride" by Chevassus et al.

Numerous other nontoxic poly(vinyl chloride) stabilizers will be readily apparent to those skilled in the art.

Typical examples of toxic poly(vinyl chloride) stabilizers include:

(1) Amine compounds such as diphenyl amine, phenyl-B-naphthylamine, formamides, lead phthalimide, and the like;

(2) Salts of heavy metals such as lead carbonate, lead stearate, cadmium stearate, cadmium laurate, barium laurate, barium oleate, strontium naphthenates, strontium stearate, tin phthalate, tin ricinoleate, lead sulfate, N-substituted ureas, thiourea, and the like; and (3) Toxic poly(vinyl chloride) stabilizers listed in the above-mentioned "The Stabilization of Polyvinyl Chloride" by Chevassus et al.

Numerous other toxic poly(vinyl chloride) stabilizers will be readily apparent to those skilled in the art.

The process of this invention is operable generally with nontoxic poly(vinyl chloride) stabilizers and toxic poly (vinyl chloride) stabilizers and the compositions of this invention can similarly be prepared generally with non-toxic poly(vinyl chloride) stabilizers and with toxic poly(vinyl chloride) stabilizers.

The beta-dicarbonyl complexes used in the practice of the present invention may be prepared by any method set forth in the prior art. Typically these compounds are prepared by:

(A) The reaction of one mole of the desired metal, or its hydride, oxide, hydroxide, oxide, hydroxide carbonate or carbide with two moles of the beta-dicarbonyl compound. These reactions are facilitated by the ready removal of hydrogen, water, carbon dioxide, or acetylene.

(B) The reaction of one mole of the metal halide, alkoxide, acetate or other suitable salt with two moles of the beta-dicarbonyl compound or its alkali metal or ammonium salts. These reactions are facilitated by the precipitation of the metal chelate or an ammonium or alkali metal salt.

Such reactions may be outlined by the following equations involving zinc acetylacetonate and zinc ethyle acetoacetate as specific examples of beta-dicarbonyl complexes.

(A)

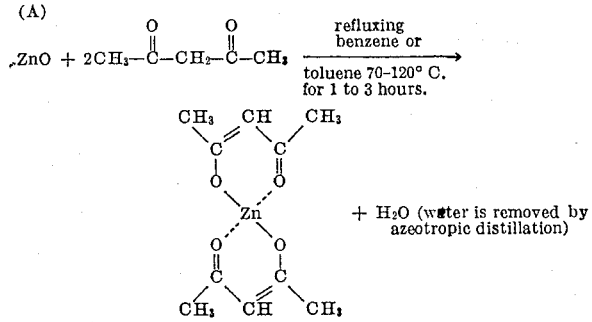

+ H₂O (water is removed by azeotropic distillation)

(B)

$$ZnCl_2 + 2NaOCH_3 \xrightarrow[25°C. \ 1 \ to \ 30 \ min.]{CH_3OH}$$

Zn(OCH₃)₂ + 2NaCl removed by filtration or centrifugation or decantation

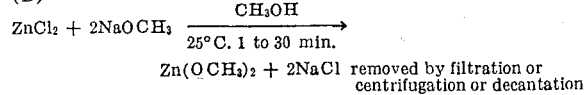

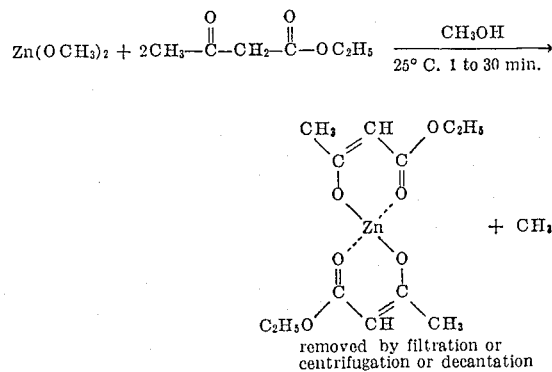

removed by filtration or centrifugation or decantation

The metal complexes used in the present invention can be added to poly(vinyl chloride) (PVC) in amounts ranging from 0.01 to 5 parts by weight per 100 parts by weight of PVC. The complex is preferably added by first dry blending a finely divided particulate chlorine containing polymer with the complex and any additional stabilizing lubricating and strength improving additives which are to be added to the composition. The dry blends may be then admixed under heat and shear conditions prior to extrusion in order to produce a homogenous mass.

In one particular preferred embodiment of the present invention, the present complexes are used in conjunction with an orthoester stabilizer which serves as an acid scavenger. The preferred orthoesters are selected from compounds which possess the following formulae:

(1)

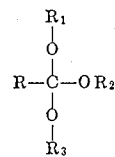

wherein R is a member selected from the group consisting of hydrogen, alkyl having about 1–20 carbon atoms, phenyl, phenylalkyl having about 7–20 carbon atoms, alkylphenylalkyl having about 8–20 carbon atoms, halophenyl, nitrophenyl, alkoxyphenyl having about 7–20 carbon atoms, carboalkoxyphenyl having up to about 20 carbon atoms, and alkenyl having up to about 20 carbon atoms and wherein each of $R_1$, $R_2$, and $R_3$ is separately alkyl having about 1–20 carbon atoms, phenyl, phenylalkyl having about 7–20 carbon atoms, alkylphenyl having about 7–20 carbon atoms and alkylphenylalkyl having about 8–20 carbon atoms.

(2)

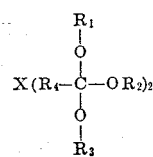

wherein $R_1$, $R_2$, and $R_3$ are as defined in (1), supra, and $R_4$ is selected from the group consisting of alkylene having about 1–20 carbon atoms, phenylene, and alkylphenylene having about 7–20 carbon atoms and wherein X is selected from the group consisting of oxygen and sulfur.

(3)

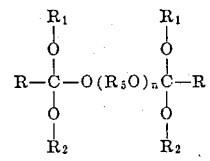

wherein R, $R_1$, and $R_2$ are as defined in (1), supra, and $R_5$ is selected from the group consisting of alkylene having about 1–20 carbon atoms, phenylene, alkylalkylene having about 2–20 carbon atoms, alkenylene having up to about 20 carbon atoms, alkenylalkoxyalkylalkylene having up to about 20 carbon atoms and where n is 1–4.

(4)

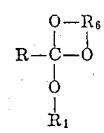

wherein R and $R_1$ are as defined in (1), supra, and $R_6$ is selected from the group consisting of alkylene having up to about 20 carbon atoms, alkylalkylene having up to about 20 carbon atoms, and alkenylalkoxyalkylalkylene having up to about 20 carbon atoms.

(5)

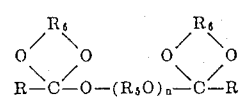

wherein R, $R_5$, and $R_6$ and n have the meanings given above.

(6)

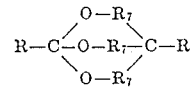

wherein R has the meaning given above and $R_7$ is an alkylene group having up to about 20 carbon atoms.

Specific examples of orthoesters which may be advantageously used in the present invention are:

Hexaethyl β,β'-thiodiorthopropionate—

$(C_2H_5O)_3C-CH_2-CH_2-S-CH_2-CH_2-C(OC_2H_5)_3$

Hexamethyl β,β'-thiodiorthopropionate—

$(CH_3O)_3CCH_2CH_2SCH_2CH_2C(OCH_3)_3$

Hexamethyl β,β'-oxydiorthopropionate—

$(CH_3O)_3CCH_2CH_2OCH_2CH_2C(OCH_3)_3$

Hexamethyl orthoadiapate—

$(CH_3O)_3-C(CH_2)_4C(OCH_3)_3$

Hexaethyl orthoadiapate—

$(C_2H_5O)_3C(CH_2)_4C(OC_2H_5)_3$ 2,2'-(oxydiethoxy)bis(2-methyl-1,3-dioxolane)—

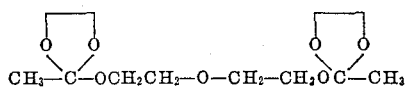

2,2'-propylenedioxybis(2,4-dimethyl-1,3-dioxolane)—

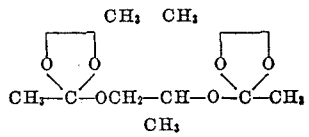

2,2'-ethylenedioxybis(2-methyl-1,3-dioxolane)—

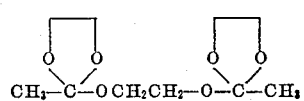

2,2'-(2,2-dimethyltrimethylenedioxy)bis(2,5,5-trimethyl-m-dioxane)—

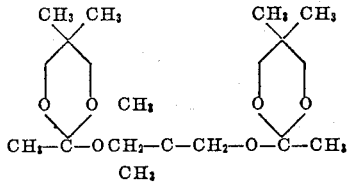

2,2'-ethylenedioxybis(2,5,5-trimethyl-m-dioxane)—

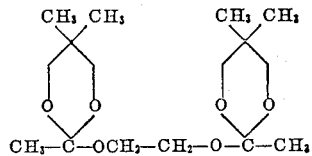

2,2,8,8-tetraethoxy-4-methyl-3,7-dioxanonane—

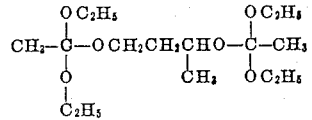

2,2'-(1-methyl-trimethylenedioxy)bis(2,6-dimethyl-m-dioxane)—

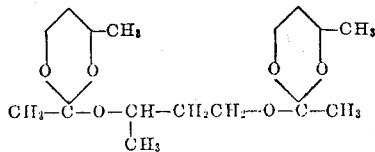

2,2,8,8-tetraethoxy-5-ethyl-5-allyloxymethyl-3,7-dioxononane—

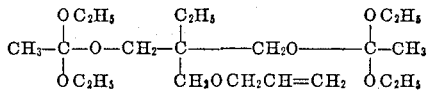

2,2'-(2-ethyl-2-allyloxymethyl trimethylenedioxy)bis-(2-methyl-5-ethyl-5-allyloxymethyl-m-dioxane)—

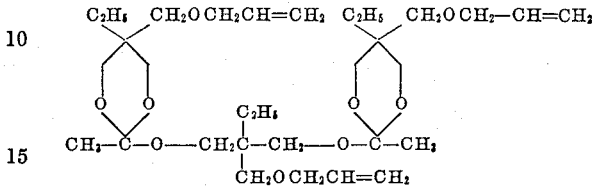

2,2,9,9-tetraethoxy-3,8-dioxa-5-decyne—

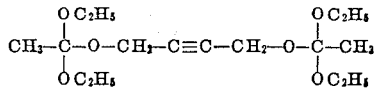

4-hydroxymethyl-1-methyl-2,6,7-trioxabicyclo[2,2,2]octane—

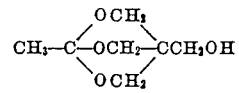

Tris(ethyl glycolate)orthoacetate—

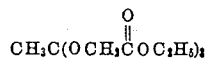

Tris(glycidol)orthoacetate—

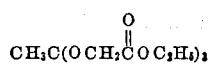

Hexa-n-propyl orthoadiapate—

$(CH_3-CH_2-CH_2O)_3C-(CH_2)_4C(OCH_2CH_2CH_3)_3$

Poly(glyceryl orthoacetate)—

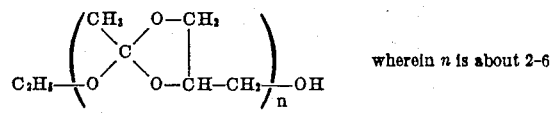

wherein n is about 2–6 or

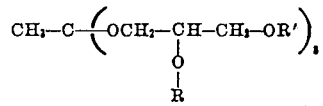

wherein any of R and R' is separately hydrogen or

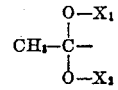

wherein any of $X_1$ through $X_2$ is separately a $C_2H_5$— group or a second R group (the second R group being in turn combined with a second

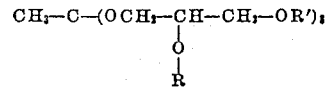

group).

The following three methods may be used to prepare the following orthoesters:

(A) Iminoester route, as set forth in Pinner, Ber., 16 356, 1644 (1883).

The appropriate nitriles are reacted with one equivalent of dry hydrogen chloride and one equivalent of alcohol to form an iminoester hydrochloride which is then alcoholyzed with an excess of alcohol to form the orthoester. The reaction may be outlined as follows:

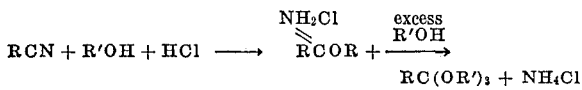

A dinitrile can be used as follows:

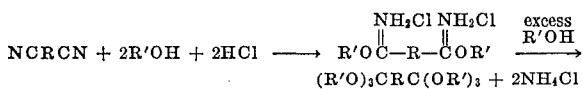

Furthermore, diols may be used at either one or both steps of the synthesis.

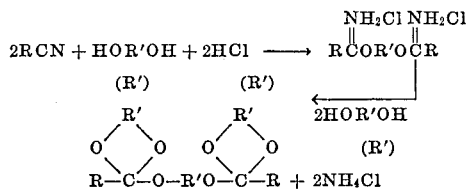

(B) Exchange reaction as described by Mkhitaryan, V. J. Gen. Chem. (U.S.S.R) 8 1361 (1938)

The alkoxy groups of a readily available orthoester such as triethyl orthoacetate are displaced by a higher boiling alcohol or polyol as follows:

$$CH_3C(OC_2H_5)_3 + 3ROH \rightarrow CH_3C(OR)_3 + 3C_2H_5OH$$

Furthermore, the reaction may be carried out in two steps with two different alcohols or polyols.

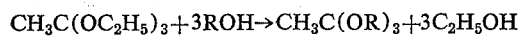

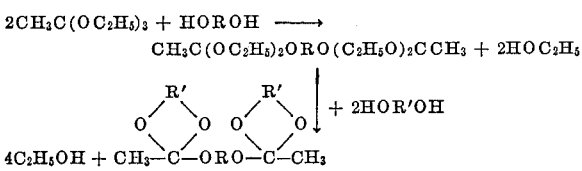

(C) Alcoholysis of triholomethyl groups as set forth by Sah, P. and Ma, S.T., J. Am. Chem. Soc. 54, 2964 (1932).

The appropriately substituted trichloromethyl compound is treated with a metal alkoxide Orthoesters, including the above described orthoesters are incorporated in poly(vinyl chloride) polymers (i.e., chlorine containing polymers in the ratio of about 0.1–15 parts (preferably about 1–10 parts) by weight per 100 parts of polymer in the resulting composition.

The zinc chelates (and chelates of other metals) can be used in the process and in the composition of this invention in their anhydrous or hydrated forms; however, the anhydrous forms are preferable because they have better shelf lives.

The epoxy compounds excellently adopted for use in the compositions and process of this invention include compounds having the general formula

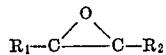

wherein each of $R_1$ and $R_2$ is separately a member of the group consisting of hydrogen, $CH_3(CH_2)_n$, and $HOCH_2(CH_2)_n$ wherein $n$ is 0–20.

Examples: Glycidol, 61; dodecene oxide, 62. (A number or numbers following the name of a compound (or composition) is the number of the example (or examples) in which the compound (or composition) was used.) The epoxides from unsaturated fatty acids and their esters may be used. Example: Epoxidized soybean oil (ESO), 1–5, 7–60, 63–65. The epoxides have been used in concentrations of 0.5 to 20 phr. (parts per 100 parts of poly(vinyl chloride)).

The calcium compounds used with zinc β-dicarbonyl complexes include:

Calcium salts of $C_1$ and $C_{20}$ straight and branched chain aliphatic mono and dicarboxylic acids. Example: stearates 2–5, 9–18, 20–27, 29–31; acetate, 45–47; undecanoate 49; heptoate 50; laurate 51; diethyl acetate 53; palmitate 55; maleate 54.

Calcium salts of aromatic carboxylic acids. Example: benzoates 7, 8, 19, 33–44, 64; salicylate 52.

Calcium complexes with β-dicarbonyl compounds. Examples: acetylacetonate 28; ethyl acetoacetate 65. These calcium compounds have been used in concentrations of 0.05 to 5.0 phr.

The hydroxy compounds used with the zinc β-dicarbonyl complexes included $C_6$ to $C_{20}$ straight and branched chain mono- and polyols.

Examples: Cetyl alcohol 2–5, 66–67; pentaerythritol 59; mannitol 10–19; sorbitol 2–43, 45–58, 61–65; trimethylol aminomethane 60. These hydroxy compounds have been used in concentrations of 0.5 to 15 phr.

Other adjuvants which have been used with stabilizer formulations which contained zinc β-dicarbonyl complexes to inhibit color formation include:

Phosphite esters in concentrations of 0.05 to 10 phr. and preferred concentrations of 0.1 to 1.0. Examples: Tri(nonylphenyl) phosphite 13–16, 18, 19, 22, 23, 31, 41, 43, 44, 60.

Processing aids (e.g., polyacrylates, ABS resins (copolymers of acrylonitrile, butadiene, and styrene), chlorinated polyethylene) in concentrations of 0.5 to 20 phr. and preferred concentrations of 1.0 to 10 phr. (Examples: Acryloid K120N (an acrylate polymer used as a processing aid), 6–9, 17–63, 65);

External lubricants in concentrations of 0.05 to 2.0 phr. and preferred concentrations of 0.1 to 1.0 phr. (Example: stearic acid 2–67); and Plasticizers in concentrations of 0.5 to 60 phr. (Example: Dioctyladipate 64).

As used herein, the term poly(vinyl chloride) encompasses homopolymers and copolymers of vinyl chloride including but not limited to copolymers of vinyl chlorine and vinylidene chloride. Both of these types of polymers are well known to those skilled in the art.

The following examples are set forth by way of illustration, and it is understood that the instant invention is not to be construed as being limited by said examples or by the details therein.

EXAMPLES 1–67

In the runs tabulated in Table I, infra, particulate PVC (poly(vinyl chloride)) was dry blended with varying amounts of the compounds discussed above. These dry blends were individually placed in the mixing chamber of a Brabender Plastograph at 190° C. which was open to the air. A roller speed of 60 r.p.m. was used to knead the polymer formulations. The Brabender Plastograph continuously recorded the torque required to knead the mass. From the resultant torque measurement, time required for the particulate mixture to fuse into a workable plastic mass, i.e. flux time, was determined. Furthermore, the time required to achieve the onset of crosslinking, i.e., decomposition time was determined. The actual temperature of the plastic mass was also continuously measured. From time to time small samples of the polymer were removed from the mixing chamber and their color compared to those of the standard Gardner scale. The results of these runs are, as noted supra, tabulated in Table I which follows:

TABLE I

| Example No. | Run | Components | Phr. | Flux Time (min.) | Polymer Temp. (°C.) | Decomp. Time (min.) After Flux | Color, Gardner Scale: 0, Colorless; 15, Brown | | | |
|---|---|---|---|---|---|---|---|---|---|---|
| | | | | | | | 2 min. | 4 min. | 10 min. | 15 min. | 20 min. |
| 1 | 742 | No additives | | | | 4.0-6.0 | >15 opaque | Black opaque | | | |
| 2 | 823, 8/1/66 | ESO | 5.0 | <0.5 | 194-223 | 17.5 | 7.0 slight haze | 11 clear | 13.5 | >15 | |
| | | Ca stearate | 0.6 | | | | | | | | |
| | | Cetyl alcohol | 2.0 | | | | | | | | |
| | | Stearic acid | 0.5 | | | | | | | | |
| 3 | 826, 8/1/66 | ZAC | 0.4 | <0.5 | 194-210 | 3.0 | 1.0 haze | | | | |
| | | ESO | 5.0 | | | | | | | | |
| | | Ca stearate | 0.6 | | | | | | | | |
| | | Cetyl alcohol | 2.0 | | | | | | | | |
| | | Stearic acid | 0.5 | | | | | | | | |
| 4 | 827, 8/1/66 | ZAC | 0.2 | <0.5 | 194-210 | 4.5 | 1.0 haze | 2.0 haze | | | |
| | | ESO | 5.0 | | | | | | | | |
| | | Ca stearate | 0.6 | | | | | | | | |
| | | Cetyl alcohol | 2.0 | | | | | | | | |
| | | Stearic acid | 0.5 | | | | | | | | |
| 5 | 828, 8/1/66 | ZAC | 0.1 | <0.5 | 190-212 | 7.5 | 0.5 slight haze | 2.0 clear | 6.0 at 7 min | | |
| | | ESO | 5.0 | | | | | | | | |
| | | Ca stearate | 0.6 | | | | | | | | |
| | | Cetyl alcohol | 2.0 | | | | | | | | |
| | | Stearic acid | 0.5 | | | | | | | | |
| 6 | 1,009 | Acryloid K120N | 5.0 | <0.5 | 199-222 | 6.0 | 5.5 opaque | >15 opaque | | | |
| | | Stearic acid | 0.5 | | | | | | | | |
| 7 | 865, 9/1/66 | ESO | 5.0 | <0.5 | 192-222 | 7.0-9.0 | 11 clear | 13 clear | Black | | |
| | | Ca benzoate | 0.33 | | | | | | | | |
| | | Acryloid K120N | 5.0 | | | | | | | | |
| | | Stearic acid | 0.5 | | | | | | | | |
| 8 | 867 | ESO | 5.0 | <0.5 | 193-213 | 4.5 | 0.5 clear | 4.0 clear | | | |
| | | Ca benzoate | 0.33 | | | | | | | | |
| | | Acryloid K120N | 5.0 | | | | | | | | |
| | | Stearic acid | 0.5 | | | | | | | | |
| 9 | 866 | ZAC | 0.1 | <0.5 | 194-212 | 5.0 | 0.5 clear | 4.0 clear | | | |
| | | ESO | 5.0 | | | | | | | | |
| | | Ca stearate | 0.5 | | | | | | | | |
| | | Acryloid K120N | 5.0 | | | | | | | | |
| | | Stearic acid | 0.5 | | | | | | | | |
| 10 | 829 | ESO | 5.0 | <0.5 | 194-218 | 9.0-9.5 | 1.5 hazy | 2.0 slight haze | 7.5 at 9 min | | |
| | | Mannitol | 1.06 | | | | | | | | |
| | | Ca stearate | 0.19 | | | | | | | | |
| | | Zn stearate | 0.75 | | | | | | | | |
| | | Stearic acid | 0.5 | | | | | | | | |
| 11 | 830 | ZAC | 0.5 | <0.5 | 192-209 | 9.0-10 | 0 | 1.25 slight haze | 2.5 clear | | |
| | | ESO | 5.0 | | | | | | | | |
| | | Mannitol | 1.06 | | | | | | | | |
| | | Ca stearate | 0.19 | | | | | | | | |
| | | Zn stearate | 0.75 | | | | | | | | |
| | | Stearic acid | 0.5 | | | | | | | | |

TABLE I—Continued

| Example No: | Run | Components | Phr. | Flux Time (min.) | Polymer Temp. (°C.) | Decomp. Time (min.) After Flux | Color, Gardner Scale; 0, Colorless; 15, Brown | | | | |
|---|---|---|---|---|---|---|---|---|---|---|---|
| | | | | | | | 2 min. | 4 min. | 10 min. | 15 min. | 20 min. |
| 12 | 834 | Zn acetate | 0.4 | 0.5-1.0 | 192-214 | 9.0 | 1.5 hazy | 1.5 slight haze | 5 at 8.5 min | | |
| | | ESO | 5.0 | | | | | | | | |
| | | Mannitol | 1.06 | | | | | | | | |
| | | Ca stearate | 0.19 | | | | | | | | |
| | | Zn stearate | 0.75 | | | | | | | | |
| | | Stearic acid | 0.5 | | | | | | | | |
| 13 | 831 | TNPP | 0.5 | <0.5 | 194-211 | 11 | 2.0 hazy | 2.5 clear | 9.5 clear | | |
| | | ESO | 5.0 | | | | | | | | |
| | | Mannitol | 1.06 | | | | | | | | |
| | | Ca stearate | 0.19 | | | | | | | | |
| | | Zn stearate | 0.75 | | | | | | | | |
| | | Stearic acid | 0.5 | | | | | | | | |
| 14 | 832 | ZAC | 0.5 | <0.5 | 194-207 | 10.5 | 0 hazy | 0 clear | 3.0 clear | | |
| | | ESO | 5.0 | | | | | | | | |
| | | Mannitol | 1.06 | | | | | | | | |
| | | Ca stearate | 0.19 | | | | | | | | |
| | | Zn stearate | 0.75 | | | | | | | | |
| | | TNPP | 0.5 | | | | | | | | |
| | | Stearic acid | 0.5 | | | | | | | | |
| 15 | 852 | ZAC | 0.5 | <0.5 | 194-214 | 8.0-8.5 | 0 slight haze | 0.5 clear | 5.0 at 8 min | | |
| | | ESO | 5.0 | | | | | | | | |
| | | Mannitol | 1.06 | | | | | | | | |
| | | Ca stearate | 0.19 | | | | | | | | |
| | | Zn stearate | 0.75 | | | | | | | | |
| | | TNPP | 0.5 | | | | | | | | |
| | | Acryloid K120N | 5.0 | | | | | | | | |
| | | Stearic acid | 0.5 | | | | | | | | |
| 16 | 856 | Zn acetate | 0.4 | <0.5 | 194-216 | 8.5 | 2.5 clear | 4.0 | 6 at 8.5 min | | |
| | | ESO | 5.0 | | | | | | | | |
| | | Mannitol | 1.06 | | | | | | | | |
| | | Ca stearate | 0.19 | | | | | | | | |
| | | Zn stearate | 0.75 | | | | | | | | |
| | | TNPP | 0.5 | | | | | | | | |
| | | Acryloid K120N | 5.0 | | | | | | | | |
| | | Stearic acid | 0.5 | | | | | | | | |
| 17 | 871 | ZAC | 0.5 | <0.5 | 190-126 | 12.5 | 1.5 hazy | 2.0 clear | 5.0 | | |
| | | ESO | 5.0 | | | | | | | | |
| | | Mannitol | 1.4 | | | | | | | | |
| | | Ca stearate | 0.6 | | | | | | | | |
| | | Acryloid K120N | 5.0 | | | | | | | | |
| | | Stearic acid | 0.5 | | | | | | | | |
| 18 | 951 | ZAC | 0.6 | <0.5 | 194-214 | 11.0 | 0 clear | <0.5 | 2.5 | | |
| | | ESO | 6.0 | | | | | | | | |
| | | Mannitol | 1.06 | | | | | | | | |
| | | Ca stearate | 0.6 | | | | | | | | |
| | | Zn stearate | 0.75 | | | | | | | | |
| | | Acryloid K120N | 5.0 | | | | | | | | |
| | | Stearic acid | 0.5 | | | | | | | | |
| | | TNPP | 0.6 | | | | | | | | |

TABLE I—Continued

| Example No: | Run | Components | Phr. | Flux Time (min.) | Polymer Temp. (°C.) | Decomp. Time (min.) After Flux | Color, Gardner Scale: 0, Colorless; 15, Brown | | | | |
|---|---|---|---|---|---|---|---|---|---|---|---|
| | | | | | | | 2 min. | 4 min. | 10 min. | 15 min. | 20 min. |
| 19 | 947 | ZAC<br>ESO<br>Mannitol<br>Ca benzoate<br>TNPP<br>Acryloid K120N<br>Stearic acid | 0.6<br>6.0<br>1.0<br>0.2<br>0.3<br>5.0<br>0.5 | <0.5 | 192–214 | 10.5 | 0 clear | 0 | 2.0 | | |
| 20 | 874 | ESO<br>Sorbitol<br>Ca stearate<br>Acryloid K120N<br>Stearic acid | 5.0<br>1.4<br>0.6<br>5.0<br>0.5 | <0.5 | 190–214 | 11.0 | 7.0 slight haze | 11 clear | >15 | | |
| 21 | 875 | ZAC<br>ESO<br>Sorbitol<br>Ca stearate<br>Acryloid K120N<br>Stearic acid | 0.5<br>5.0<br>1.4<br>0.6<br>5.0<br>0.5 | <0.5 | 190–216 | 10.0 | 1.5 slight haze | 2.0 clear | 4.0 | | |
| 22 | 876 | ZAC<br>ESO<br>Sorbitol<br>Ca stearate<br>TNPP<br>Acryloid K120N<br>Stearic acid | 0.5<br>5.0<br>1.4<br>0.6<br>0.5<br>5.0<br>0.5 | <0.5 | 192–216 | 8.0 | 1.0 clear | 1.5 | 7.0 | | |
| 23 | 884 | ZAC<br>ESO<br>Sorbitol<br>Ca stearate<br>Acryloid K120N<br>Stearic acid | 0.6<br>5.0<br>1.0<br>0.4<br>5.0<br>0.5 | <0.5 | 192–220 | 9.0 | 0 clear | 1.0 | 3.0 | | |
| 24 | 883 | ZAC<br>ESO<br>Sorbitol<br>Ca stearate<br>Acryloid K120N<br>Stearic acid | 0.6<br>5.0<br>1.0<br>0.4<br>5.0<br>0.5 | <0.5 | 192–220 | 9.0 | 0 clear | 1.0 | 3.0 | | |
| 25 | 825 | ZAC<br>ESO<br>Sorbitol<br>Ca stearate<br>Acryloid K120N<br>Stearic acid | 0.8<br>5.0<br>1.2<br>0.2<br>5.0<br>0.5 | <0.5 | 198–218 | 8.5 | 0 clear | 1.0 | Black | | |
| 26 | 886 | ZAC<br>ESO<br>Sorbitol<br>Ca stearate<br>Acryloid K120N<br>Stearic acid | 0.6<br>5.0<br>1.0<br>0.3<br>5.0<br>0.5 | <0.5 | 192–219 | 8.5 | <0.5 slight haze | 1.5 clear | 4.5 | | |

TABLE I—Continued

| Example No: | Run | Components | Phr. | Flux Time (min.) | Polymer Temp. (°C.) | Decomp. Time (min.) After Flux | Color, Gardner Scale: 0, Colorless; 15, Brown | | | |
|---|---|---|---|---|---|---|---|---|---|---|
| | | | | | | | 2 min. | 4 min. | 10 min. | 15 min. | 20 min. |
| 27 | 888 | ZAC<br>ESO<br>Sorbitol<br>Ca stearate<br>Acryloid K120N<br>Stearic acid | 0.8<br>5.0<br>1.2<br>0.2<br>5.0<br>0.5 | <0.5 | 192–218 | 8.0 | 0 clear | <0.5 | Black | | |
| 28 | 894 | ZAC<br>ESO<br>Sorbitol<br>Ca acetylacetonate<br>Acryloid K120N<br>Stearic acid | 0.8<br>5.0<br>1.2<br>0.2<br>5.0<br>0.2 | <0.5 | 193–218 | 9.5 | 1.0 slight haze | 1.5 clear | 3.0 | | |
| 29 | 895 | ZAC<br>ESO<br>Sorbitol<br>Ca stearate<br>Acryloid K120N<br>Stearic acid | 0.6<br>5.0<br>2.0<br>0.4<br>5.0<br>0.5 | <0.5 | 195–220 | 10–11 | 0 hazy | 1.5 clear | 2.5 | | |
| 30 | 910 | Zn stearate<br>ESO<br>Sorbitol<br>Ca stearate<br>Acryloid K120N<br>Stearic acid | 1.4<br>5.0<br>2.0<br>0.4<br>5.0<br>0.5 | <0.5 | 194–215 | 10–11 | 3.0 hazy | 4.5 slight haze | 5.0 slight haze | | |
| 31 | 911 | ZAC<br>ESO<br>Sorbitol<br>Ca stearate<br>Acryloid K120N<br>Stearic acid<br>TNPP | 0.6<br>5.0<br>2.0<br>0.4<br>5.0<br>0.5<br>0.5 | <0.5 | 194–219 | 12 | 0 clear | 0.5 | 5.0 | | |
| 32 | 930 | ZAC<br>ESO<br>Sorbitol<br>Acryloid K120N<br>Stearic acid | 0.6<br>5.0<br>2.0<br>5.0<br>0.5 | <0.5 | 194–214 | 13 | <0.5 clear | 1.0 | 2.5 | | |
| 33 | 913 | ZAC<br>ESO<br>Sorbitol<br>Ca benzoate<br>Acryloid K120N<br>Stearic acid | 0.6<br>5.0<br>2.0<br>0.2<br>5.0<br>0.5 | <0.5 | 194–214 | 13 | <0.5 clear | 1.0 | 2.5 | | |
| 34 | 914 | ZAC<br>ESO<br>Sorbitol<br>Ca benzoate<br>Acryloid K120N<br>Stearic acid | 0.6<br>3.0<br>2.0<br>0.2<br>5.0<br>0.5 | <0.5 | 195–218 | 9.5 | <0.5 clear | 1.0 | Black | | |

TABLE I—Continued

| Example No. | Run | Components | Phr. | Flux Time (min.) | Polymer Temp. (°C.) | Decomp. Time (min.) After Flux | Color, Gardner Scale: 0, Colorless; 15, Brown | | | | |
|---|---|---|---|---|---|---|---|---|---|---|---|
| | | | | | | | 2 min. | 4 min. | 10 min. | 15 min. | 20 min. |
| 35 | 928 | ZAC | 0.6 | <0.5 | 194-219 | 14 | 0 clear | 1.0 | 2.5 | | |
| | | ESO | 7.5 | | | | | | | | |
| | | Sorbitol | 2.0 | | | | | | | | |
| | | Ca benzoate | | | | | | | | | |
| | | Acryloid K120N | 5.0 | | | | | | | | |
| | | Stearic acid | 0.5 | | | | | | | | |
| 36 | 929 | ZAC | 0.6 | <0.5 | 192-207 | 25 | 0 clear | 1.0 | 1.5 | 2.5 | |
| | | ESO | 10 | | | | | | | | |
| | | Sorbitol | 2.0 | | | | | | | | |
| | | Ca benzoate | | | | | | | | | |
| | | Acryloid K120N | 5.0 | | | | | | | | |
| | | Stearic acid | 0.5 | | | | | | | | |
| 37 | 925 | ZAC | 0.6 | <0.5 | 198-211 | 7.0 | <0.5 clear | 1.0 | | | |
| | | ESO | 5.0 | | | | | | | | |
| | | Sorbitol | 1.0 | | | | | | | | |
| | | Ca benzoate | 0.2 | | | | | | | | |
| | | Acryloid K120N | 5.0 | | | | | | | | |
| | | Stearic acid | 0.5 | | | | | | | | |
| 38 | 926 | ZAC | 0.6 | <0.5 | 192-213 | 18 | 0 clear | 1.0 | 2.5 | 6.5 | 11 |
| | | ESO | 5.0 | | | | | | | | |
| | | Sorbitol | 3.0 | | | | | | | | |
| | | Ca benzoate | 0.2 | | | | | | | | |
| | | Acryloid K120N | 5.0 | | | | | | | | |
| | | Stearic acid | 0.5 | | | | | | | | |
| 39 | 927 | ZAC | 0.6 | <0.5 | 196-210 | 20.5 | <0.5 slight haze | 1.5 slight haze | 2.0 clear | 6.5 | |
| | | ESO | 5.0 | | | | | | | | |
| | | Sorbitol | 4.0 | | | | | | | | |
| | | Ca benzoate | 0.2 | | | | | | | | |
| | | Acryloid K120N | 5.0 | | | | | | | | |
| | | Stearic acid | 0.5 | | | | | | | | |
| 40 | 916 | ZAC | 0.8 | <0.5 | 195-215 | 13 | 0 clear | 1.0 | 2.5 | | |
| | | ESO | 5.0 | | | | | | | | |
| | | Sorbitol | 2.0 | | | | | | | | |
| | | Ca benzoate | | | | | | | | | |
| | | Acryloid K120N | 5.0 | | | | | | | | |
| | | Stearic acid | 0.5 | | | | | | | | |
| 41 | 917 | ZAC | 0.6 | <0.5 | 195-220 | 12 | 0 clear | 1.0 | 2.5 | | |
| | | ESO | 5.0 | | | | | | | | |
| | | Sorbitol | 2.0 | | | | | | | | |
| | | Ca benzoate | | | | | | | | | |
| | | Acryloid K120N | 5.0 | | | | | | | | |
| | | Stearic acid | 0.5 | | | | | | | | |
| | | TNPP | 0.3 | | | | | | | | |
| 42 | 938 | ZAC | 0.6 | <0.5 | 196-215 | 13 | <0.5 clear | 1.5 | 3.5 | | |
| | | ESO | 4.0 | | | | | | | | |
| | | Sorbitol | 3.0 | | | | | | | | |
| | | Ca benzoate | 0.2 | | | | | | | | |
| | | Acryloid K120N | 5.0 | | | | | | | | |
| | | Stearic acid | 0.5 | | | | | | | | |

TABLE I—Continued

| Example No. | Run | Components | Phr. | Flux Time (min.) | Polymer Temp. (°C.) | Decomp. Time (min.) After Flux | Color, Gardner Scale: 0, Colorless; 15, Brown | | | |
|---|---|---|---|---|---|---|---|---|---|---|
| | | | | | | | 2 min. | 4 min. | 10 min. | 15 min. | 20 min. |
| 43 | 939 | ZAC<br>ESO<br>Sorbitol<br>Ca benzoate<br>Acryloid K120N<br>Stearic acid<br>TNPP | 0.6<br>6.0<br>1.0<br>0.2<br>5.0<br>0.5<br>0.3 | <0.5 | 195–217 | 10–11 0 clear | <0.5 | 2.5 | | |
| 44 | 944 | ZAC<br>ESO<br>Ca benzoate<br>Acryloid K120N<br>Stearic acid<br>TNPP | 0.6<br>4.0<br>0.2<br>5.0<br>0.5<br>0.3 | <0.5 | 185–200 | 4.0 Black | | | | |
| 45 | 920 | ZAC<br>ESO<br>Sorbitol<br>Ca acetate<br>Acryloid K120N<br>Stearic acid | 0.6<br>5.0<br>2.0<br>0.1<br>5.0<br>0.5 | <0.5 | 193–215 | 13 <0.5 haze | 1.0 clear | 3.0 | | |
| 46 | 921 | ZAC<br>ESO<br>Sorbitol<br>Ca acetate<br>Acryloid K120N<br>Stearic acid | 0.6<br>5.0<br>2.0<br>0.2<br>5.0<br>0.5 | <0.5 | 190–216 | 16 <0.5 clear | 1.5 | 2.5 | 7.0 | |
| 47 | 954 | ZAC<br>ESO<br>Sorbitol<br>Ca acetate<br>Acryloid K120N<br>Stearic acid | 0.6<br>5.0<br>2.0<br>0.1<br>5.0<br>0.5 | <0.5 | 193–216 | 9.5 0 clear | <0.5 | | | |
| 48 | 964 | ZAC<br>ESO<br>Sorbitol<br>Acryloid K120N<br>Stearic acid | 0.6<br>6.0<br>1.0<br>5.0<br>0.5 | <0.5 | 195–216 | 9.5 0 clear | <0.5 | | | |
| 49 | 955 | Same as 964 but using Ca undecanoate | 0.25 | <0.5 | 194–216 | 10 0 slight haze | <0.5 clear | 2.5 | | |
| 50 | 956 | Same as 964 but using Ca heptoate | 0.2 | <0.5 | 194–216 | 10 0 clear | <0.5 | 2.0 | | |
| 51 | 957 | Same as 964 but using Ca laurate | 0.27 | <0.5 | 194–216 | 11 ...do | <0.5 | 2.5 | | |
| 52 | 958 | Same as 964 but using Ca salicylate | 0.2 | <0.5 | 195–216 | 11 ...do | <0.5 | 2.5 | | |
| 53 | 959 | Same as 964 but using Ca diethyl acetate | 0.16 | <0.5 | 197–216 | 8.5 ...do | <0.5 | | | |
| 54 | 960 | Same as 964 but using Ca malonate | 0.07 | <0.5 | 194–217 | 9.0 ...do | <0.5 | | | |
| 55 | 961 | Same as 964 but using Ca palmitate | 0.18 | <0.5 | 194–213 | 10 ...do | <0.5 | 2.5 | | |
| 56 | 962 | Same as 964 but using Ca thioglycollate | 0.07 | <0.5 | 194–215 | 10.5 ...do | <0.5 | 2.5 | | |
| 57 | 963 | Same as 964 but using Ca tartrate | 0.15 | <0.5 | 195–216 | 8.5 ...do | <0.5 | | | |
| 58 | 965 | Same as 964 but using Ca diglutamate | 0.12 | <0.5 | 194–216 | 10.5 <0.5 clear | 1.5 | 4.5 | | |

TABLE I—Continued

| Example No: | Run | Components | Phr. | Flux Time (min.) | Polymer Temp. (°C.) | Decomp. Time (min.) After Flux | Color, Gardner Scale: 0, Colorless; 15, Brown | | | | | |
|---|---|---|---|---|---|---|---|---|---|---|---|---|
| | | | | | | | 2 min. | 4 min. | 10 min. | 15 min. | 20 min. |
| 59 | 971 | ZAC<br>ESO<br>Pentaerythritol<br>Ca benzoate<br>Acryloid K120N<br>Stearic acid | 0.6<br>6.0<br>1.0<br>0.2<br>5.0<br>0.5 | <0.5 | 194-214 | 7.5 | 0 clear | <0.5 | | | |
| 60 | 1,021 | ZAC<br>ESO<br>Trimethylol aminomethane<br>Acryloid K120N<br>TNPP | 0.5<br>6.0<br>1.0<br>0.5<br>0.3 | <0.5 | 195-210 | 7.0-10 | 1.0 clear | 1.5 | 1.4 | | |
| 61 | 1,007 | ZAC<br>Glycidol<br>Sorbitol<br>Acryloid K120N<br>Stearic acid | 0.5<br>6.0<br>1.0<br><br>0.5 | 4.0 | 175-211 | 10 | <0.5 hazy | 1.0 hazy | 2.5 hazy | | |
| 62 | 1,008 | ZAC<br>Dodecene oxide<br>Sorbitol<br>Acryloid K120N<br>Stearic acid | 0.5<br>6.0<br>1.0<br>5.0<br>0.5 | <0.5 | 190-219 | 9-10 | 0 clear | <0.5 | 4.5 | | |
| 63 | 997 | ZAC<br>ESO<br>Sorbitol<br>Acryloid K120N<br>Stearic acid | 0.5<br>6.0<br>1.0<br>5.0<br>0.5 | <0.5 | 193-217 | 9.5 | 0 | 0.5 | 9.5 | | |
| 64 | 925 | ZAC<br>ESO<br>Sorbitol<br>Ca benzoate<br>Stearic acid<br>Dioctyl adipate | 0.6<br>5.0<br>2.0<br>0.2<br>0.5<br>20.0 | <0.5 | 178-195 | 48 | 0 clear | <0.5 | 1.5 | 1.5 | 2.0 |
| 65 | 934 | ZAC<br>ESO<br>Sorbitol<br>Ca ethyl acetoacetate<br>Acryloid K120N<br>Stearic acid | 0.6<br>5.0<br>2.0<br>0.2<br>5.0<br>0.5 | <0.5 | 196-218 | 14 | 1.5 clear | 2.0 | 2.5 | | |
| 66 | 936 | ZAC monohydrate<br>ESO<br>Poly (glyceryl orthoacetate)<br>Cetyl alcohol<br>Stearic acid | 0.5<br>5.0<br>2.0<br><br>0.5 | <0.5 | 192-209 | 13 | 0 clear | <0.5 | 1.5 | | |
| 67 | 837 | ZAC<br>Poly (glyceryl orthoacetate)<br>Cetyl alcohol<br>Stearic acid | 0.5<br>5.0<br>2.0<br>0.5 | <0.5 | 190-207 | 12.5 | 0 clear | <0.5 | 1.5 | | |

The resin used in the examples reported in this table was QYSJ, a particulate poly(vinyl chloride) having a number average molecular weight of about 38,000.
Phr. is parts by weight per 100 parts by weight of poly(vinyl chloride) resin.
ESO is epoxidized soybean oil.
ZAC is zinc acetylacetonate.
Acryloid K120N is an acrylate polymer used as a processing aid.
TNPP is tri(nonylphenyl) phosphite.

EXAMPLES 68-84

In the runs tabulated in Table II, infra, particulate PVC (poly(vinyl chloride)) was dry blended with varying amounts of zinc acetylacetonate, glyceryl orthoacetate, cetyl alcohol, stearic acid, and occasionally trinonylphenyl phosphite (TNPP). These dry blends were individually placed in the mixing chamber of a Brabender Plastograph at 190° C. which was open to the air. A roller speed of 60 r.p.m. was used to knead the polymer formulations. The Brabender Plastograph continuously recorded the torque required to knead the mass. From the resultant torque measurement, time required for the particulate mixture to fuse into a workable plastic mass, i.e. flux time, was determined. Furthermore, the time required to achieve the onset of crosslinking, i.e., decomposition time was determined. The actual temperature of the plastic mass was also continuously measured. From time to time small samples of the polymer were removed from the mixing chamber and their color compared to those of the standard Gardner scale. The results of these runs are, as stated supra, tabulated in the table which follows:

TABLE II

| No. Ex. | Components | Phr. | Flux Time (min.) | Polymer Temp. (° C.) | Decomp. Time (min.) After Flux | Color, Gardner Scale: 0, Colorless; 15, Brown | | | | |
|---|---|---|---|---|---|---|---|---|---|---|
| | | | | | | 2 min. | 4 min. | 10 min. | 15 min. | 20 min. |
| 68 | No additives | | <1.0 | 194-223 | 4.0-6.0 | 15 opaque | Black opaque | | | |
| 69 | Glyceryl orthoacetate | 3.0 | <1.0 | 197-211 | 6.5 | 3.5 clear | 3.0 clear | Black at 6.5 min | | |
| 70 | Glyceryl orthoacetate | 3.0 | <1.0 | 190-216 | 7.0 | 1.5 clear | 1.25 clear | Black at 7.0 min | | |
| | Cetyl alcohol | 2.0 | | | | | | | | |
| | Stearic acid | 0.5 | | | | | | | | |
| 71 | Glyceryl orthoacetate | 3.0 | <1.0 | 192-210 | 7.0 | 0.75 clear | 1.25 clear | Black at 7.0 min | | |
| | Zn acetylacetonate | 0.24 | | | | | | | | |
| | Cetyl alcohol | 2.0 | | | | | | | | |
| | Stearic acid | 0.5 | | | | | | | | |
| 72 | Glyceryl orthoacetate | 3.0 | <1.0 | 194-210 | 8.0 | 0.25 clear | 0.5 clear | | | |
| | Zn acetylacetonate | 0.5 | | | | | | | | |
| | Cetyl alcohol | 2.0 | | | | | | | | |
| | Stearic acid | 0.5 | | | | | | | | |
| 73 | Glyceryl orthoacetate | 3.0 | <1.0 | 196-211 | 8.5 | 0.0 clear | 0.0 clear | Black at 8.5 min | | |
| | ZAC | 0.5 | | | | | | | | |
| | TNPP | 1.0 | | | | | | | | |
| | Cetyl alcohol | 2.0 | | | | | | | | |
| | Stearic acid | 0.5 | | | | | | | | |
| 74 | Glyceryl orthoacetate | 5.0 | <1.0 | 192-214 | 7.5-8.5 | 2.5 clear | 2.0 clear | | | |
| 75 | Glyceryl orthoacetate | 5.0 | <1.0 | 190-212 | 10.5 | 1.0 clear | 1.25 clear | 1.25 clear | | |
| | ZAC | 0.1 | | | | | | | | |
| | Cetyl alcohol | 2.0 | | | | | | | | |
| | Stearic acid | 0.5 | | | | | | | | |
| 76 | Glyceryl orthoacetate | 5.0 | <1.0 | 194-211 | 10.5 | 0.75 clear | 1.00 clear | 1.25 clear | | |
| | ZAC | 0.2 | | | | | | | | |
| | Cetyl alcohol | 2.0 | | | | | | | | |
| | Stearic acid | 0.5 | | | | | | | | |
| 77 | Glyceryl orthoacetate | 5.0 | <1.0 | 196-211 | 10.5 | 0.5 clear | 0.5 clear | 1.25 clear | | |
| | ZAC | 0.3 | | | | | | | | |
| | Cetyl alcohol | 2.0 | | | | | | | | |
| | Stearic acid | 0.5 | | | | | | | | |
| 78 | Glyceryl orthoacetate | 5.0 | <1.0 | 196-214 | 10.75 | 0.25 clear | 0.5 clear | 1.25 clear | | |
| | ZAC | 0.4 | | | | | | | | |
| | Cetyl alcohol | 2.0 | | | | | | | | |
| | Stearic acid | 0.5 | | | | | | | | |
| 79 | Glyceryl orthoacetate | 5.0 | <1.0 | 196-214 | 10.5 | 0.25 clear | 0.25 clear | 2.0 clear | | |
| | ZAC | 0.5 | | | | | | | | |
| | Cetyl alcohol | 2.0 | | | | | | | | |
| | Stearic acid | 0.5 | | | | | | | | |
| 80 | Glyceryl orthoacetate | 4.0 | <1.0 | 196-209 | 9.0 | 0.25 clear | 0.25 clear | Black at 10 min | | |
| | ZAC | 0.67 | | | | | | | | |
| | Cetyl alcohol | 2.7 | | | | | | | | |
| | Stearic acid | 0.5 | | | | | | | | |
| 81 | Glyceryl orthoacetate | 5.0 | <1.0 | 190-214 | 13.5 | 0.25 clear | 0.25 clear | 1.0 clear | | |
| | ZAC | 0.5 | | | | | | | | |
| | TNPP | 1.0 | | | | | | | | |
| | Cetyl alcohol | 2.0 | | | | | | | | |
| | Stearic acid | 0.5 | | | | | | | | |
| 82 | Glyceryl orthoacetate | 5.0 | <1.0 | 195 | 14.5 | 0.0 | 0.0 | 1.5 | (1) | |
| | ZAC | 0.5 | | | | | | | | |
| | TNPP | 0.5 | | | | | | | | |
| | Cetyl alcohol | 1.5 | | | | | | | | |
| | Stearic acid | 0.5 | | | | | | | | |
| 83 | Glyceryl orthoacetate | 5.0 | <1.0 | 193-211 | 15.0 | 0.0 | 0.0 | 1.5 | 3.0 | |
| | ZAC | 0.3 | | | | | | | | |
| | TNPP | 0.5 | | | | | | | | |
| | Cetyl alcohol | 1.5 | | | | | | | | |
| | Stearic acid | 0.5 | | | | | | | | |
| 84 | Glyceryl orthoacetate | 5.0 | <1.0 | 190 | 13.0 | 1.0 | 1.0 | 2.0 | (2) | |
| | TNPP | 0.5 | | | | | | | | |

[1] Black 2.0 at 14 min.
[2] 3.0 at 13 min.

The resin used in the examples reported in this table was QYSJ, a particular poly(vinyl chloride) having a number average molecular weight of about 38,000.

Phr. is parts by weight per 100 parts of poly(vinyl chloride) resin.
ZAC is zinc acetylacetonate.
TNPP is trinonylphenyl phosphite.

EXAMPLES 85-90

To illustrate the utility of the above zinc chelate, the following compositions were compounded with polyvinyl chloride and tested in a conventional manner as indicated in Table III which follows:

TABLE III

| Example | Components | Phr. | Flux Time (min.) | Torque (kg.) | Polymer Temp. (° C.) | Decomp. Time (min.) After Flux | Color, Gardner Scale: 0, Colorless; 15, Brown | | |
|---|---|---|---|---|---|---|---|---|---|
| | | | | | | | 2 min. | 4 min. | 10 min. |
| 85 | ZAC | 0.2 | 0 | 1.5-2.4 | 191-217 | 13.5 | 1.0 | 1.5 | 1.5 |
| | Poly(glycerylorthoacetate) | 5.0 | | | | | | | |
| | Cetyl alcohol | 2.0 | | | | | | | |
| | Stearic acid | 0.5 | | | | | | | |
| 86 | Zn ethylacetoacetate | 0.8 | 0 | 1.5-2.4 | 193-214 | 13.5 | 0.5 | 1.0 | 1.0 |
| | Poly(glycerylorthoacetate) | 5.0 | | | | | | | |
| | Cetyl alcohol | 2.0 | | | | | | | |
| | Stearic acid | 0.5 | | | | | | | |
| 87 | Poly(glycerylorthoacetate) | 5.0 | 0 | 1.4-2.4 | 190-210 | 15.5 | 2.0 | 2.0 | 2.0 |
| | Cetyl alcohol | 2.0 | | | | | | | |
| | Stearic acid | 0.5 | | | | | | | |
| 88 | Zn ethylacetoacetate | 0.2 | 0 | 1.5-2.4 | 194-214 | 11.5 | 2.5 | 6.5 | 15 |
| | ESO | 5.0 | | | | | | | |
| | Acryloid K120N | 5.0 | | | | | | | |
| | Ca stearate | 0.4 | | | | | | | |
| | Sorbitol | 2.0 | | | | | | | |
| | Stearic acid | 0.5 | | | | | | | |
| 89 | ZAC | 0.8 | 0 | 1.5-2.4 | 194-214 | 9.0 | 2.0 | 6.5 | |
| | ESO | 5.0 | | | | | | | |
| | Acryloid K120N | 5.0 | | | | | | | |
| | Ca stearate | 0.4 | | | | | | | |
| | Sorbitol | 2.0 | | | | | | | |
| | Stearic acid | 0.5 | | | | | | | |
| 90 | ESO | 5.0 | 0 | 1.5-2.3 | 194-210 | 11.0 | 7.0 | 15 | >15 |
| | Acryloid K120N | 5.0 | | | | | | | |
| | Ca stearate | 0.4 | | | | | | | |
| | Sorbitol | 2.0 | | | | | | | |
| | Stearic acid | 0.5 | | | | | | | |

The resin used in the Examples reported in this table was QYSJ, a particulate poly(vinyl chloride) having a number average molecular weight of about 38,000.
Phr. is parts by weight per 100 parts by weight of poly(vinyl chloride) resin.
ESO is epoxidized soybean oil.
ZAC is zinc acetylacetonate.
Acryloid K120N is an acrylate polymer used as a processing aid.
TNPP is tri (nonylphenyl) phosphite.

The above examples clearly indicate that the use of zinc acetylacetonate provides a superior stabilizing system for high molecular weight chlorine containing polymers.

As used herein the term "percent (%)" means parts per hundred by weight unless otherwise defined where used and the term "parts" means parts by weight unless otherwise defined where used. The term "phr" means parts by weight per hundred parts by weight of resin (polymer).

I claim:
1. A composition of matter consisting essentially of about:
   (a) 100 parts by weight of poly(vinylchloride);
   (b) about 0.05-20 parts by weight of an orthoester stabilizer having the formula

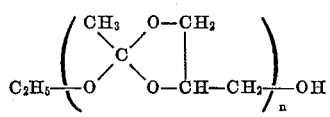

wherein $n$ is about 2-6; and (c) about 0.01-5 parts by weight of zinc acetylacetonate.
2. The composition of claim 1 in which said composition consists essentially of 100 parts by weight of poly(vinyl chloride), about 0.1-10 parts of the stabilizer and about 0.2-1 parts of the zinc compound.

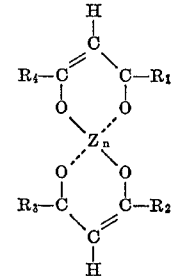

References Cited
UNITED STATES PATENTS

| 2,307,075 | 1/1943 | Quattlebaum | 260—45.85 |
| 2,997,454 | 8/1961 | Leistner | 260—45.8 |
| 3,214,399 | 10/1965 | Saccomandi | 260—45.75 |
| 3,255,136 | 6/1966 | Hecker | 260—23 |
| 3,259,597 | 7/1966 | Burger | 260—45.75 |

DONALD E. CZAJA, Primary Examiner

V. P. HOKE, Assistant Examiner

U.S. Cl. X.R.
260—23, 45.8, 45.85, 45.9, 45.95

UNITED STATES PATENT OFFICE
CERTIFICATE OF CORRECTION

Patent No. 3,492,267      Dated January 27, 1970

Inventor(s) Louis Leonard Wood

It is certified that error appears in the above-identified patent and that said Letters Patent are hereby corrected as shown below:

The formula

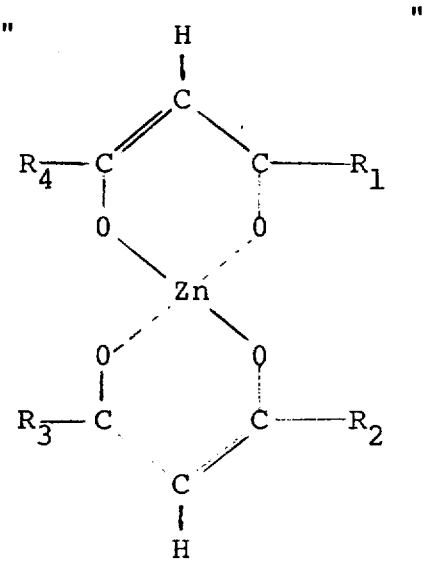

occurring in Column 28, lines 44-54 (between Claim 2 and the heading "References Cited"), is cancelled.

SIGNED AND
SEALED
JUN 23 1970

(SEAL)
Attest:

Edward M. Fletcher, Jr.
Attesting Officer

WILLIAM E. SCHUYLER, JR.
Commissioner of Patents